June 9, 1942.  R. M. PFALZGRAFF  2,286,008
MAGNETIC CORE FOR ELECTRICAL DEVICES AND METHODS OF MAKING THE SAME
Filed Aug. 2, 1940
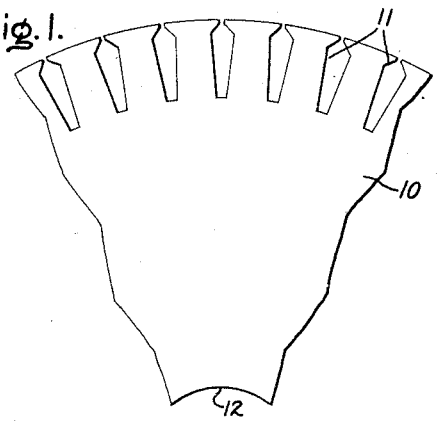
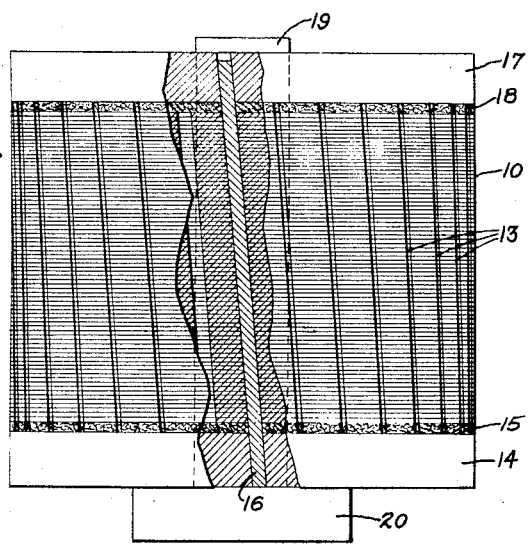
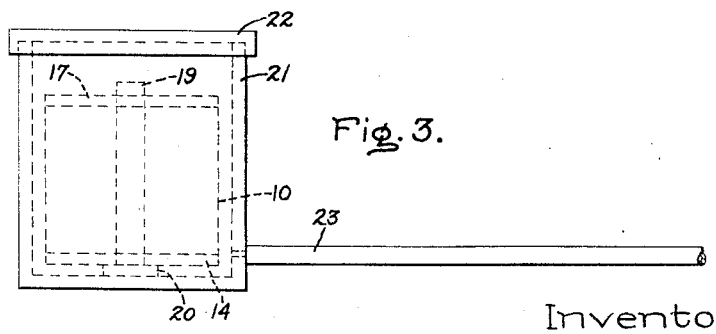
Inventor:
Ross M. Pfalzgraff,
by Harry E. Dunham
His Attorney.

Patented June 9, 1942

2,286,008

UNITED STATES PATENT OFFICE 2,286,008

MAGNETIC CORE FOR ELECTRICAL DEVICES AND METHOD OF MAKING THE SAME

Ross M. Pfalzgraff, Marblehead, Mass., assignor to General Electric Company, a corporation of New York Application August 2, 1940, Serial No. 349,942

5 Claims. (Cl. 172—120)

My invention relates to improvements in magnetic cores for electrical devices such as the rotatable member of dynamo-electric machines and to improved methods of making the same.

In certain types of electrical machinery such as the rotors of induction motors, it sometimes is desirable to increase the electrical losses in the core and to provide a core having a relatively high reactance. In the past, these cores have been made of solid bars of steel which are shaped to the desired dimensions and drilled to form slots into which the winding is assembled. Obviously, such winding slots must be made of a relatively simple shape and, generally speaking, have a round or cylindrical form and extend through the solid core in a direction parallel to the axis of the core. For certain applications, deep winding slots and winding slots having particular configurations other than a circular cross section are desirable, and it long has been the practice to provide skewed slots for induction motor windings to obtain a smoother and more regular torque and a quieter operating rotor and it is desirable to provide a rotor having such a winding with the characteristics of a rotor having a high eddy current loss substantially solid core. These features, however, are not readily obtainable if the rotor core is made from a single steel bar.

An object of my invention is to provide an improved core for electrical devices having winding slots therein and formed of laminated magnetic material which will enable the use of winding slots of any desired configuration.

Another object of my invention is to provide an element for an electrical device wherein the core may be in the form of a solid unitary element provided with skewed winding slots and a winding therein.

A further object of my invention is to provide an improved method of making the above type of cores for electrical devices.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a plan view of a part of a lamination of the type used in an electrical element embodying my invention; Fig. 2 shows an assembly of laminations as arranged for the brazing step in my improved method of making a core for an electrical device embodying my invention, partly broken away to show the assembly pin in the laminated core; and Fig. 3 illustrates schematically the core shown in Fig. 2 in a brazing furnace.

My invention is particularly applicable to cores for electrical devices wherein it is desirable to provide a solid core of magnetic material having a particular configuration or arrangement of winding slots with a winding therein which cannot readily be made in a solid unitary piece of material. The core of the rotatable member of an induction motor often is provided with winding slots having an irregular configuration and which are skewed and do not extend through the core in a direction at right angles to the outer plane end of the core. For certain applications, it is desirable that the reactance of such a rotor should be relatively high and that the eddy-current losses therein also should be high. Both of these latter features can be obtained by forming the core as a solid unitary element. In order to obtain this type core, I provide core laminations 10 of magnetic material having winding slots 11 of the desired configuration for a suitable winding and a central opening 12 for the passage of a shaft formed in the laminations by any conventional method. When these laminations are assembled to form a core it is desirable to have good electrical contact between adjacent laminations to provide the above characteristics; however, these laminations generally are coated on the outer surface thereof with an oxide film which forms a layer of insulation thereon. In order to provide a better electrical contact between adjacent laminations, this insulating oxide is removed from about the laminations by placing them in an acid pickling bath, after which a relatively thin layer of low electrical resistance brazable material is applied to each side of the laminations by plating a layer of copper thereon to a thickness between .5 and .75 mils. These plated laminations are then assembled in a press to provide the desired height of core under a relatively high pressure of about twenty tons with the winding slots 11 arranged to provide skewed slots 13 through the core. After this assembly, the laminations 10 are removed from the press and are mounted on a steel plate 14 with a sheet of asbestos 15 arranged between the plate 14 and the lowermost lamination 10. The laminations are retained in desired assembled relation upon the plate 14 by a plurality of wooden assembly pins 16 which extend obliquely upwardly from the plate 14 within the slots 13 to maintain these winding slots in the desired skewed relationship, and the complete assembly is formed about a graphite arbor 19 which extends through the shaft opening 12 in the laminations and is supported upon a steel hub or base 20 arranged under the plate 14. A second steel plate 17 is arranged over the laminations with a sheet 18 of asbestos or layer of other suitable non-brazable material between the uppermost lamination and the plate 16 and is of such weight as to maintain the laminations under a predetermined pressure to provide the desired finished height of core. The asbestos sheets 15 and 18 are arranged between the steel plates 14 and 17 to prevent brazing of these plates to the outermost laminations, and slots are formed in these asbestos sheets to correspond to the slots 11 in the laminations 10, so that any excess of brazable material may flow out into the slots in the asbestos sheets when the assembled core is placed in the brazing furnace. This assembly then is placed in a brazing furnace 21 which is substantially hermetically sealed by any suitable means, such as a closure 22, in order to obtain the desired brazing together of adjacent laminations 10 forming the core. The furnace 21 is raised to a temperature between 1100° C. and 1150° C. and is held at this temperature for about thirty minutes. It is necessary that this temperature be sufficiently high to provide a uniform and complete brazing together of the laminations throughout their contact surfaces and that this temperature should not be high enough to cause penetration of the graphite arbor 19 into the steel of the laminations 10. The most desirable temperature for this brazing operation has been found to be about 1135° C. In order to obtain the desired brazing together of the laminations without the formation of undesirable iron oxides thereon, the brazing furnace 21 is filled with an inert gas such as hydrogen, which is supplied thereto through an intake 23 connected to any suitable source of hydrogen supply. Conventional methods of brazing together laminations have not been found to provide the desired uniformity of brazing between adjacent laminations that can be provided by the above-described method which enables the building of a core to provide predetermined characteristics thereto. This method provides a member for an electrical machine which is formed as a solid unitary element comprising a plurality of laminations of magnetic material with winding slots therein of a desired configuration and arrangement for a winding and which has the desired high reactance and high eddy-current losses provided by good electrical contact formed by the relatively thin coating of copper on each side of the laminations which retains them securely together by a brazed bond and provides alternate layers of magnetic material and relatively low electrical resistance material.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A member for an electrical device having an element with winding slots formed therein, said element comprising a plurality of laminations of magnetic material, a winding in said winding slots, and means including a relatively thin low electrical resistance layer bond between adjacent side surfaces of said laminations for securing together said laminations and for increasing the eddy-current losses therein.

2. A member for an electrical device having an element comprising a plurality of laminations of magnetic material with winding slots therein and having a relatively thin coating of copper on each side thereof, a winding in said slots, and means including said relatively thin layer of copper between adjacent laminations securing together said laminations in assembled relationship by a brazed bond between the adjacent laminations of said laminations and for increasing the eddy-current losses therein.

3. A member for an electrical machine having an element formed of a plurality of laminations of magnetic material with winding slots therein, said laminations having a relatively thin coating of brazable material on substantially all of each side thereof and being assembled to provide skewed winding slots therethrough, a winding in said slots, and means including said relatively thin layer of brazable material securing together said laminations by a brazed bond between adjacent laminations of said laminations and for increasing the eddy-current losses therein.

4. The method of making a solid core for an electrical device which comprises forming a plurality of laminations of magnetic material with winding slots therein, removing the oxide film from the surface of the laminations, applying a relatively thin layer of brazable material to each side of the laminations, assembling the laminations between metal plates with a layer of non-brazable material between the outer laminations and the metal plates, and securing together the laminations by brazing the layer of brazable material between adjacent laminations by heating the assembled laminations in an atmosphere of inert gas.

5. The method of making a solid core for the rotatable member of a dynamo-electric machine which comprises forming a plurality of laminations of magnetic material with winding slots therein, removing oxide from the surface of the laminations by an acid bath, applying a layer of copper plating between .5 and .75 mils thick to each side of the laminations, assembling the laminations to provide skewed winding slots and subjecting them to a pressure of about twenty tons, removing the pressure, arranging the laminations on a graphite arbor, and brazing together the laminations by the layer of copper plating between the laminations by heating the assembled laminations in an atmosphere of hydrogen to a temperature between 1100° C. and 1150° C. for about thirty minutes.

ROSS M. PFALZGRAFF.